United States Patent [19]
Okada et al.

[11] Patent Number: 5,247,359
[45] Date of Patent: Sep. 21, 1993

[54] FIELD DECISION CIRCUIT FOR PROVIDING ERROR FREE ODD/EVEN FIELD INFORMATION

[75] Inventors: Hisao Okada, Nara; Yuji Yamamoto, Kobe, both of Japan

[73] Assignee: Sharp Kabushiki Kaisha, Osaka, Japan

[21] Appl. No.: 766,342

[22] Filed: Sep. 27, 1991

[30] Foreign Application Priority Data

Sep. 28, 1990 [JP] Japan .................................. 2-261484

[51] Int. Cl.⁵ .............................................. H04N 5/10
[52] U.S. Cl. .................................. 358/152; 358/148; 358/150; 358/160
[58] Field of Search ............... 358/160, 166, 167, 148, 358/152, 36, 37, 153, 159

[56] References Cited

U.S. PATENT DOCUMENTS

| | | | |
|---|---|---|---|
| 4,246,610 | 1/1981 | Takahashi | 358/167 |
| 4,403,253 | 9/1983 | Morris et al. | 358/166 |
| 4,701,793 | 10/1987 | den Hollander et al. | 358/152 |
| 4,792,853 | 12/1988 | Yamagishi et al. | 358/153 |
| 5,025,496 | 6/1991 | Canfield | 358/148 |
| 5,057,928 | 10/1991 | Nagashima et al. | 358/148 |

FOREIGN PATENT DOCUMENTS 63-246980 10/1988 Japan.
63-262177 11/1988 Japan.

OTHER PUBLICATIONS

Foreign Search Report.
Translated Abstract of Japanese Appln. No. 63-246980.
Translated Abstract of Japanese Appln. No. 63-272177.

*Primary Examiner*—James J. Groody
*Assistant Examiner*—Jeffrey S. Murrell

[57] ABSTRACT

Field information for a predetermined number of fields produced by another field judgment circuit is stored in a first memory. The output of the field decision circuit which is indicative of the field information for the predetermined number of fields is stored in a second memory. The contents of the first memory are compared with those of the second memory. When the contents of the first memory disagree with the contents of the second memory for all of the predetermined number of fields, the field information is output as the field information from the field decision circuit.

3 Claims, 8 Drawing Sheets

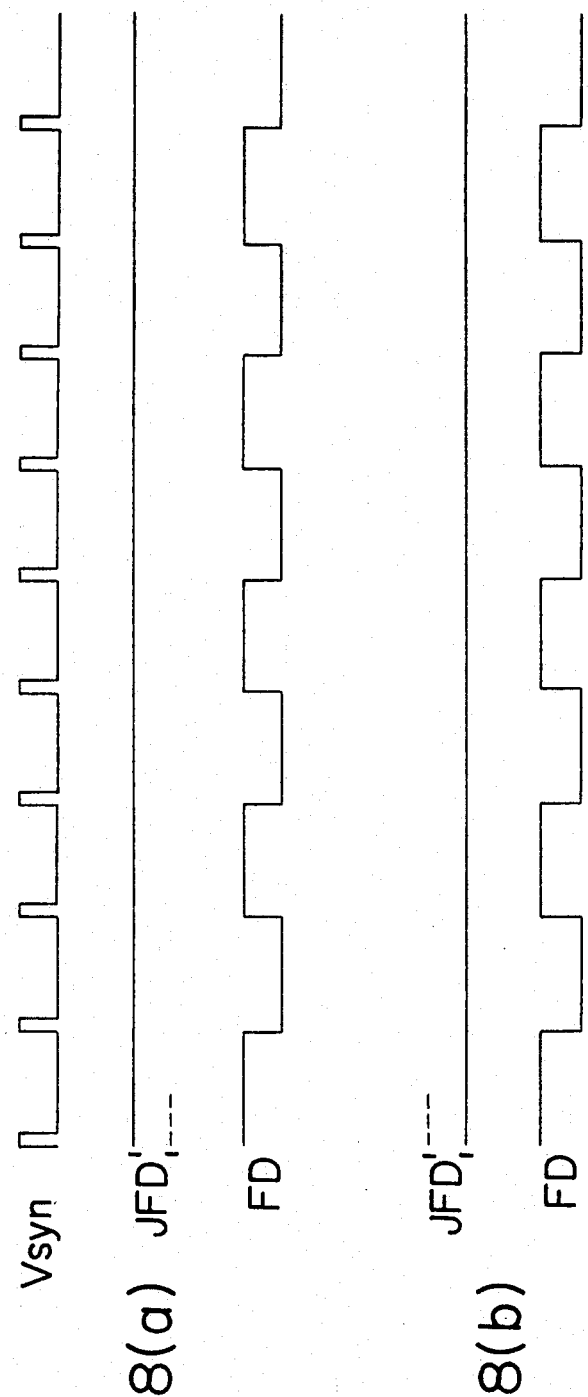

FIELD DECISION CIRCUIT FOR PROVIDING ERROR FREE ODD/EVEN FIELD INFORMATION

BACKGROUND OF THE INVENTION

1. Field of the Invention

This invention relates to a field decision circuit for deciding the fields of video signals in an interlaced scanning system.

2. Description of the Background

In a display of a video signal used in the interlaced scanning system (hereinafter, such a video signal is referred to as "an interlaced video signal"), one frame consists of an odd field in which odd-number scanning lines are selected and an even field in which even-number scanning lines are selected. Therefore, field information to determine whether the current field is the odd field or even field is essential for a display apparatus for performing interlaced scanning display. Conventionally, there have been no independent field decision circuits, and the output from a field judgment circuit which judges the odd and even fields of an interlaced video signal has been used as field information in other circuits or units which require such information.

However, such a judgment circuit often mal-functions. The factors which cause a judgment circuit to malfunction are related to an interlaced video signal or synchronizing signal supplied to a field judgment circuit which includes a noise or variation in the timing of a synchronizing signal which appears during a reproduction operation of a videotape recorder. There arises no problem unless such noise is generated or such variation does occur. However, it is difficult to completely prevent the malfunction of a field judgment circuit under weak broadcasting waves or during a special reproduction operation of a videotape recorder in which the rotary system is improperly adjusted.

In a flat display apparatus, the influence of the discrimination of video signal fields on the image quality are growing because of their driving characteristics. Particularly, a large-sized liquid crystal display apparatus uses field information as location deciding information for reproducing a video signal on its screen, and also as information for alternating the polarity of voltages applied to pixels. Therefore, field judgment errors may degrade the display quality or cause an irreversible change of the optical state of the liquid crystal (i.e., a breakdown of the display apparatus).

SUMMARY OF THE INVENTION

The field decision circuit of this invention, which overcomes the above-discussed and numerous other disadvantages and deficiencies of the prior art, comprises: decision means for producing field information; first store means for receiving further field information from another external circuit, and for storing the further field information for a predetermined number of successive previous fields; second store means for storing the field information for the predetermined number of successive previous fields; and comparison means for comparing the contents of the first store means with the contents of the second store means. When the comparison result obtained by the comparison means satisfies a predetermined relationship, the decision means changes the contents of the field information so as to coincide with the further field information.

In preferred embodiments, said predetermined relationship is that the contents of the first store means disagree with the contents of the second store means for all of the predetermined number of successive previous fields.

In preferred embodiments, the other external circuit is a field judgment circuit for judging the odd and even fields of an interlaced video signal.

Thus, the invention described herein makes possible the objectives of:

(1) providing a field decision circuit which can supply error-free field information; and (2) providing a field decision circuit which can eliminate error information included in the output of a field judgment circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This invention may be better understood and its numerous objects and advantages will become apparent to those skilled in the art by reference to the accompanying drawings which are given by way of illustration only, and thus are not limitative of the present invention, and wherein:

FIGS. 8(a) and 8(b) are timing charts illustrating the operation of the circuit of the invention in the case where the output level of a field judgment circuit is fixed.

DESCRIPTION OF THE PREFERRED EMBODIMENTS

Figure 1:
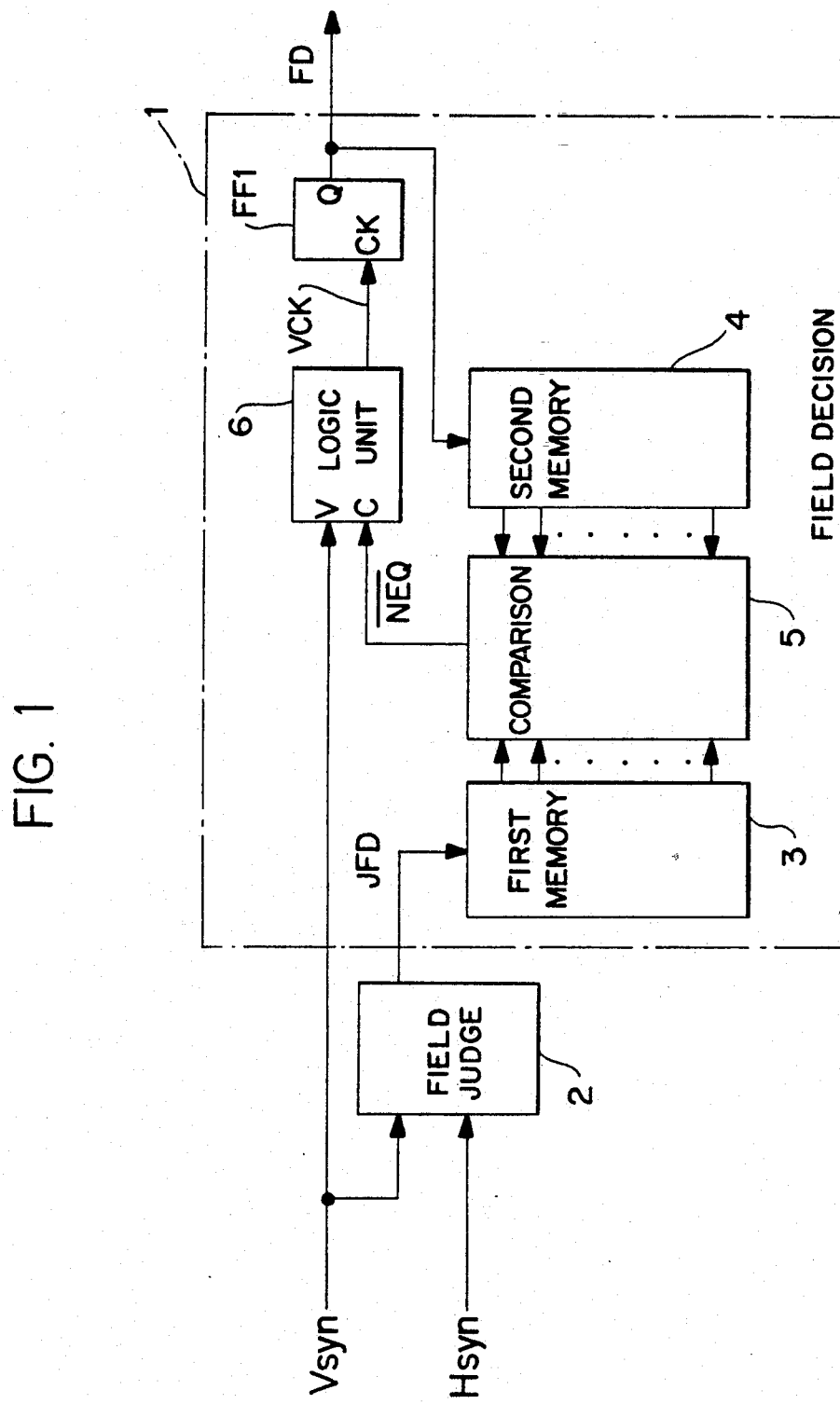
FIG. 1 is a block diagram illustrating an embodiment of the invention.

FIG. 1 illustrates an embodiment of the invention. In this embodiment, a field decision circuit 1 is connected to a field judgment circuit 2 which judges fields based on a vertical synchronizing signal $V_{syn}$ and a horizontal synchronizing signal $H_{syn}$ and generates a judged result JFD. The field decision circuit 1 comprises a first memory 3, a second memory 4, a comparator 5, a logic unit 6, and a flip-flop FF1. The first memory 3 stores the judged result JFD of the field judgment circuit 2 over a predetermined number of previous fields. The second memory 4 stores the decided result of the field decision circuit 1 over a predetermined number of previous fields. The comparator 5 compares the contents of the memory 3 with those of memory 4. In the description given below, odd fields correspond to "1" (High), and even fields to "0" (Low). For the sake of simplification, it is assumed that the memories 3 and 4 can store information for four fields.

An output $\overline{NEQ}$ of the comparator 5 which compares the contents of the memories 3 and 4 is Low only when both the contents disagree with each other, and High when this is not the case. The output $\overline{NEQ}$ of the comparator 5 is coupled to one input (C input) of the logic unit 6.

The logic unit 6 receives at another input (V input) the vertical synchronizing signal $V_{syn}$ (or alternatively a pulse signal synchronized with the vertical synchronizing signal). An output VCK of the logic unit 6 is coupled to the clock input CK of the flip-flop FF1. The output FD of the flip-flop FF1 is inverted each time when a pulse signal is input to the clock input CK. When the C input is inactive, the logic unit 6 passes the signal supplied to the V input (in this case, the vertical synchronizing signal $V_{syn}$), and, when the C input is active, blocks the signal supplied to the V input. Normally, therefore, the vertical synchronizing signal $V_{syn}$ is supplied to the clock input CK of the flip-flop FF1. In contrast, when the output $\overline{NEQ}$ of the comparator 5 (i.e., the C input of the logic unit 6) is "0" (Low), the logic unit 6 blocks the next vertical synchronizing signal $V_{syn}$ so that, even if the vertical synchronizing signal is inverted at its next timing, the output FD of the flip-flop FF1 is not inverted and has the same value as the judged result JFD of the field judgment circuit 2. This condition is continued thereafter.

Figure 2:
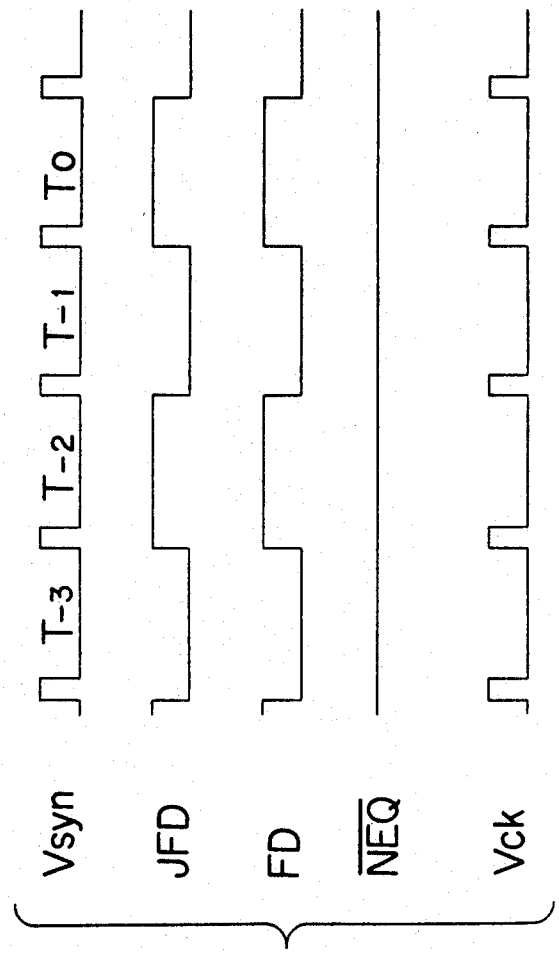
FIGS. 2 and 3 are timing charts illustrating the operation of the embodiment shown in FIG. 1.

The operation of the field decision circuit 1 will be described with reference to FIGS. 2 and 3. If the current field is $T_0$, the memories 3 and 4 store the judged result JFD and output FD at fields $T_{-3}$-$T_0$, respectively. As shown in FIG. 2, the values of the judged result JFD and output FD at fields $T_{-3}$-$T_0$ are in complete agreement with each other, and thus the contents of the memories 3 and 4 are in complete agreement with each other so that the output $\overline{NEQ}$ of the comparator 5 is High. Therefore, the output VCK of the logic unit 6 coincides with the vertical synchronizing signal $V_{syn}$, and continues to be the same as the judged result JFD of the field judgment circuit 2.

Figure 3:
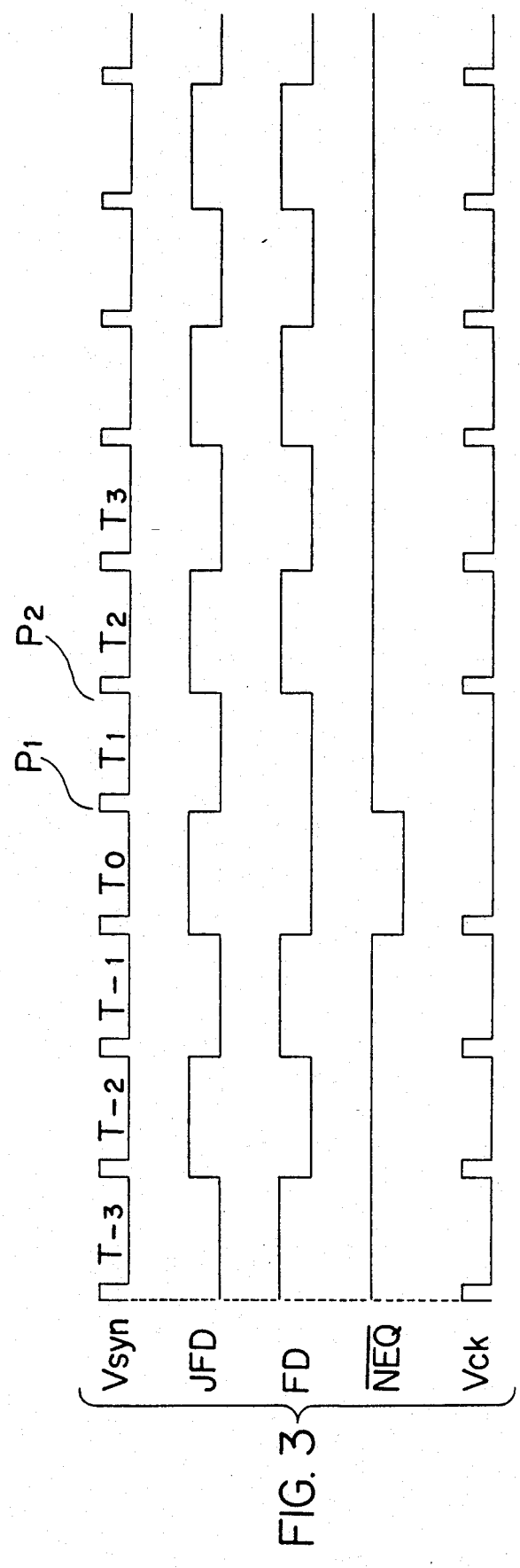

In contrast, if the values of the judged result JFD and output FD at fields $T_{-3}$-$T_0$ do not agree with each other for some reason, as shown in FIG. 3, the values of the judged result JFD at fields $T_{-3}$-$T_0$ (or the contents of the memory 3) disagree with the values of the output FD at fields $T_{-3}$-$T_0$ (or the contents of the memory 4). This causes the output $\overline{NEQ}$ of the comparator 5 and the C input of the logic unit 6 to become Low at field $T_0$, thereby blocking the next vertical synchronizing signal $V_{syn}$ indicated by reference numeral $P_1$, as shown in "VCK" in FIG. 3. Since the clock input CK receives no signal at the timing $P_1$, the output FD of the flip-flop FF1 does not change at the timing $P_1$, and thus the values of the judged result JFD and output FD become coincident with each other at the next field $T_1$. At timing $T_1$, the comparator 5 compares the judged result JFD and output FD at fields $T_{-2}$-$T_1$. Although the judged result JFD and output FD at fields $T_{-2}$-$T_0$ may be different from each other, they agree with each other at field $T_1$, causing the output $\overline{NEQ}$ of the comparator 5 to become High. This makes the further next vertical synchronizing signal $V_{syn}$ indicated by reference numeral $P_2$ to pass through the logic unit 6. This condition is continued thereafter.

In the embodiment, as described above, the judged result JFD of the field judgment circuit 2 is checked over four fields. When the judged result JFD disagrees with the output FD of the field decision circuit 1 (i.e., the decided state of the current field (odd or even field)) for all succeeding four fields, the judged result JFD is regarded as correct, and the output FD of the field decision circuit 1 is changed so as to agree with the judged result JFD.

Figure 4:
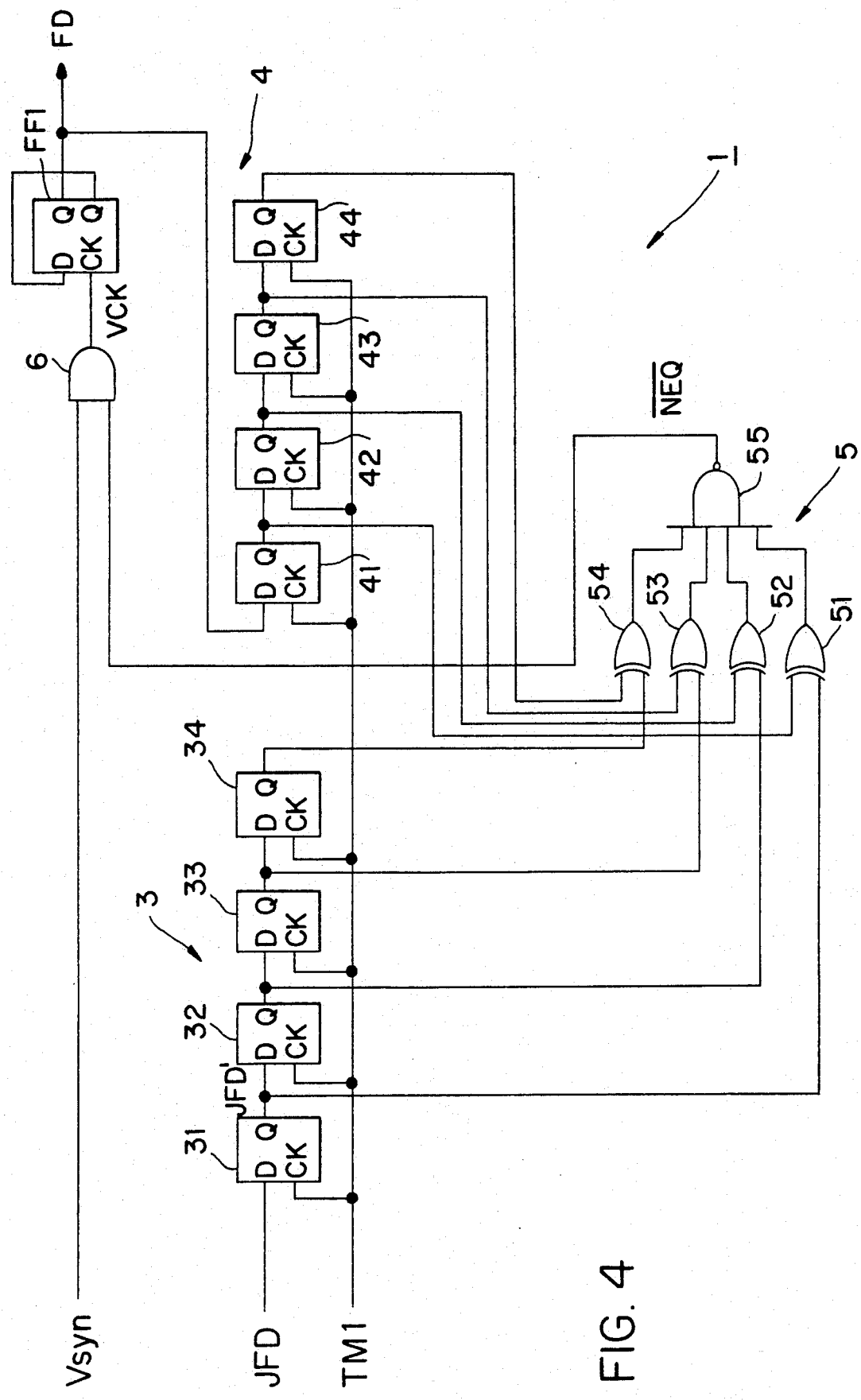
FIG. 4 is a circuit diagram illustrating the embodiment shown in FIG. 1 in more detail.

FIG. 4 illustrates the field decision circuit 1. Each of the memories 3 and 4 is a shift register having four D-type flip-flops 31-34 and 41-44 which are connected in series. A timing signal TM1 is supplied to the shift registers as a clock signal. The timing signal TM1 is in synchronization with the vertical synchronizing signal $V_{syn}$, but slightly phase-shifted therewith. The comparator 5 comprises four exclusive OR gates 51-54 and a four-input NAND gate 55. The judged result JFD from the field judgment circuit 2 is supplied to the first flip-flop 31 of the memory 3, and the output FD is coupled to the first flip-flop 41 of the memory 4. The outputs of the first flip-flops 31 and 41 of the two memories 3 and 4 are coupled to the inputs of the first exclusive OR gate 51. Similarly, the outputs of the second to fourth flip-flops are coupled to the second to fourth exclusive OR gates, respectively. The outputs of the exclusive OR gates 51-54 are coupled to the inputs of the NAND gate 55. The logic unit 6 is a two-input AND gate, and the flip-flop FF1 is a D-type flip-flop. The output of the NAND gate 55 is coupled to one input of the AND gate 6.

Figure 5:
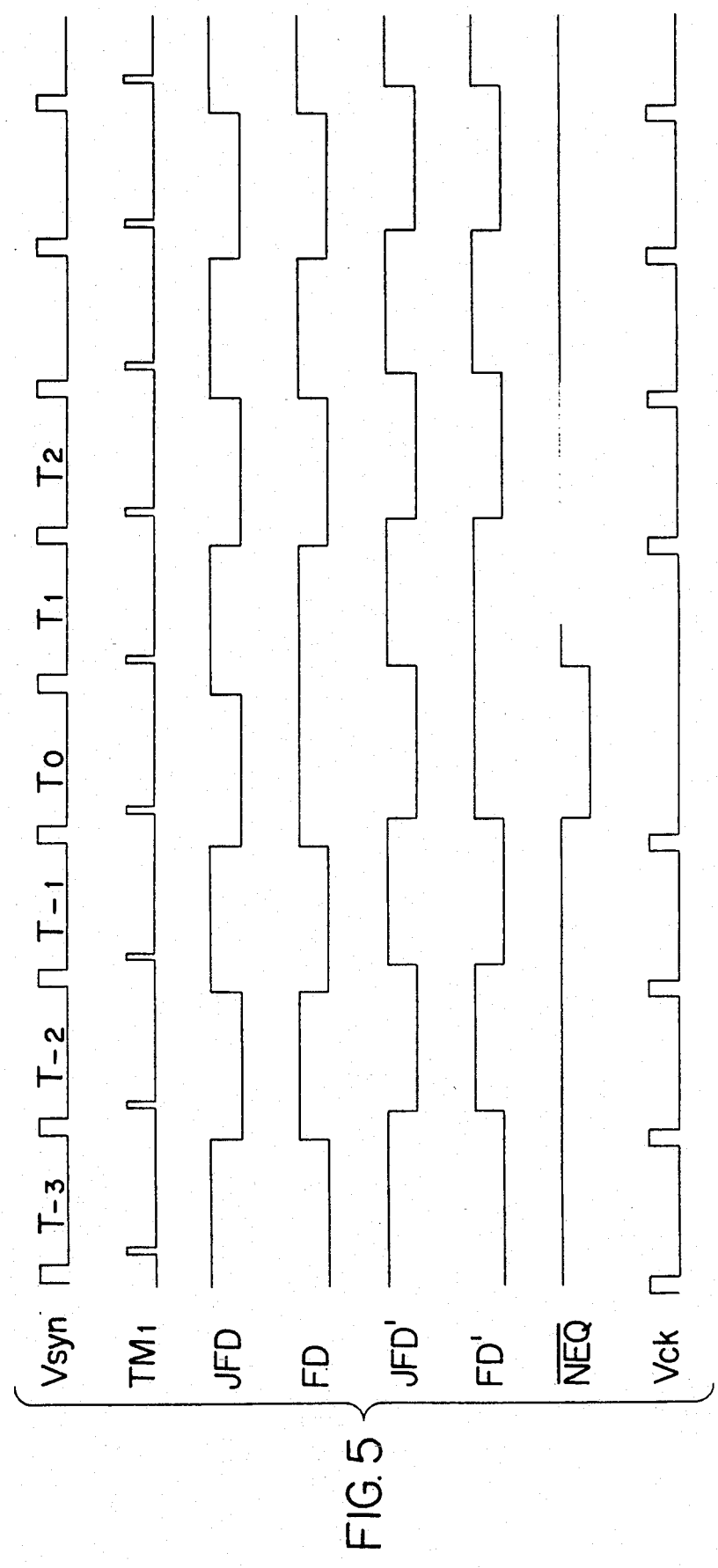
FIG. 5 is a timing chart further illustrating the operation of the embodiment.

Waveforms of various portions of the circuit of FIG. 4 are shown in FIG. 5. When the values of the judged result JFD at fields $T_{-3}$-$T_0$ fail to agree with the corresponding values of the output FD, the outputs of the corresponding flip-flops in the memories 3 and 4 are different from each other, and the output FD of the field decision circuit 1 is made to coincide with the judged result JFD at timing $T_1$.

Figure 6:
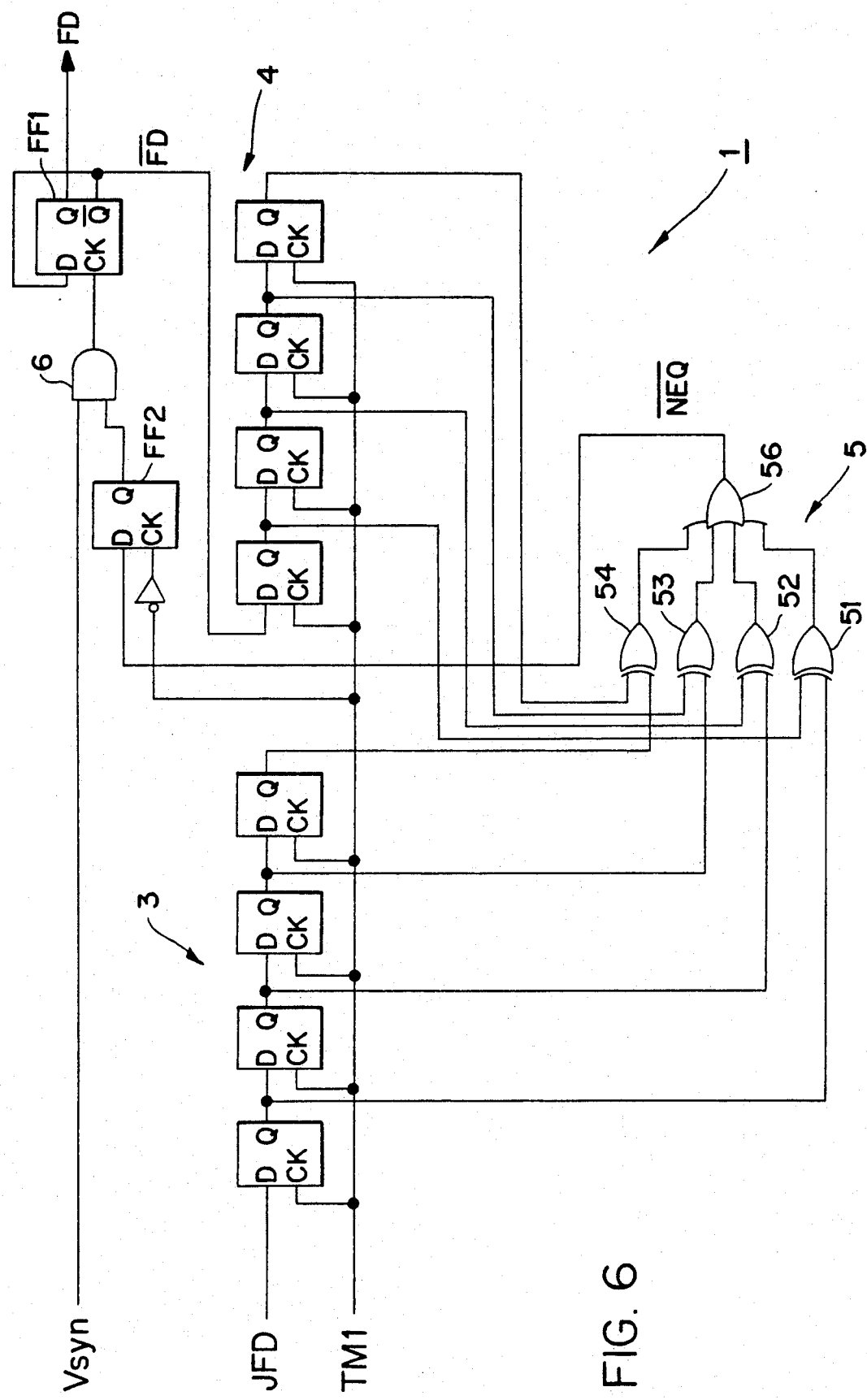
FIG. 6 is a circuit diagram illustrating another embodiment of the invention.
Figure 7C:
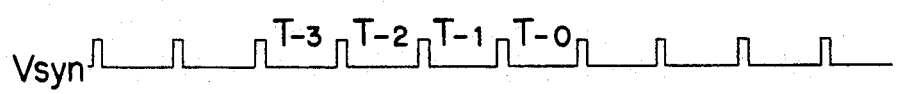
FIGS. 7(a)-7(e) are timing charts illustrating the operation of the circuit of the invention in the case where the outputs of a field judgment circuit are incorrect.
Figure 7A:
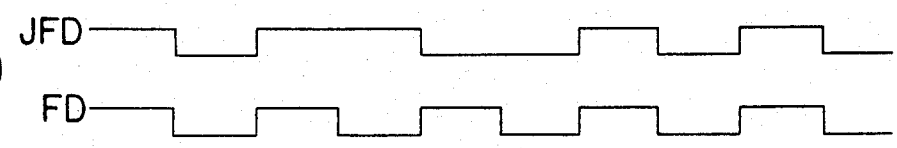
Figure 7B:
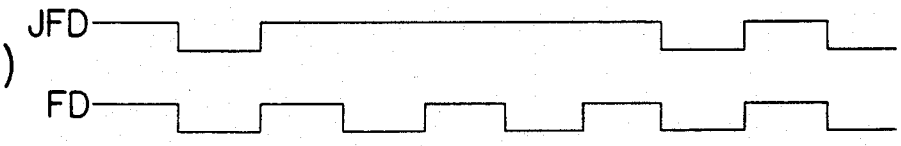
Figure 7D:
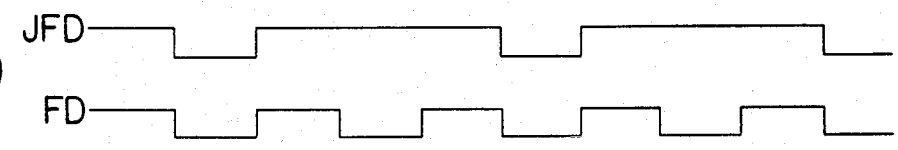
Figure 7E:
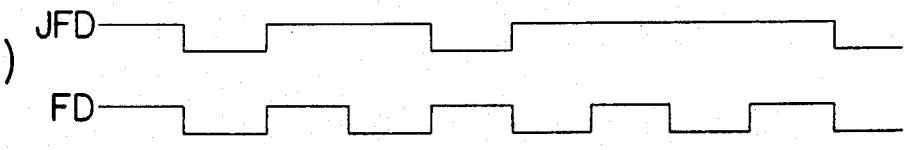

FIG. 6 illustrates another embodiment of the invention. In the embodiment, the inverted output $\overline{FD}$ of the flip-flop FF1 is supplied to the second memory 4. A four-input OR gate 56 is employed in place of the NAND gate 55 in the first embodiment. Contrary to the first embodiment, the output $\overline{NEQ}$ of the comparator 5 becomes Low when the outputs of all the corresponding flip-flops of the memories 3 and 4 agree with each other. The output $\overline{NEQ}$ of the comparator 5 is supplied to the logic unit 6 through a flip-flop FF2 which uses the rise of the inversion of the timing signal TM1 (i.e., the fall of the timing signal TM1) as the clock. By this arrangement, the malfunction based on a glitch of the output of the comparator 5 can be avoided.

FIG. 7 shows various examples of waveforms of the input JFD (i.e., the output from the field judgment circuit 2) affected by noise and also of the output FD of the field decision circuit 1. As seen from the figure, even when the output JFD of the field judgment circuit has malfunctioned, the output FD of the field decision circuit according to the invention is not at all affected by the malfunction of the output JFD.

FIG. 8 shows the output FD of the field decision circuit obtained when the output JFD from the field judgment circuit is fixed at High ((a) of FIG. 8) or at Low ((b) of FIG. 8). This occurs when a video signal source in which the field is fixed is connected to the circuit. Even in such a case, the output FD correctly repeats High and Low.

When the field decision circuit according to the invention is combined with a field judgment circuit, any decision errors based on the erroneous operation of the field judgment circuit can be almost entirely prevented, thus highly reliable field information can be obtained. In an embodiment having storage means for four fields, an incorrect output of the field judgment circuit due to noise or variation in the synchronizing signal can pass through the field decision circuit only when four successive errors have occurred. Similarly, in an embodiment having storage means for n fields, the same takes place only when n errors have successively occurred.

If the probability that a field judgment circuit receiving an input signal causes any error is assumed to be 1/P, it can be regarded as an independent phenomenon. When such a field judgment circuit and the field decision circuit according to the invention having storage means for n fields are used in combination, therefore, the probability that the field decision is erroneous is $(1/P)^n$. Namely, when $P=10$, the error probability of 1/10 can be reduced to $(1/10)^n$. Paradoxically speaking, only when one error has occurred and all of the subsequent $(n-1)$ decisions are erroneous, the field decision circuit according to the invention generates erroneous field information. In other words, when an error has occurred in a field, the field decision circuit according to the invention checks in the succeeding $(n-1)$ fields whether this error has been caused by malfunction or this phenomenon has truly occurred.

Furthermore, even if a field judgment circuit has caused errors, only one of $P^{n-1}$ errors can pass through the field decision circuit of the invention, and other $(P^{n-1}-1)$ errors are eliminated by the field decision circuit. When the above-mentioned number n is sufficiently large (e.g., $n=8$), the field decision circuit of the invention can produce substantially error-free field information. The number of the fields to be compared (i.e., the number n) can be easily increased.

According to the invention, the output FD of the field decision circuit can be inverted without fail in response to every input of the vertical synchronizing signal $V_{syn}$. As described above, when a liquid crystal display panel is driven, the AC drive of the liquid crystal layer is required. Unless the AC drive is performed perfectly, the optical state of the liquid crystal may change irreversibly, and the liquid crystal display panel will break down. The field decision circuit of the invention which can ensure the AC drive for any kind of video signals (even those in which odd and even fields are not distinguishable) is very useful for a liquid crystal display apparatus.

As described above, the field decision circuit of the invention can eliminate errors in field information produced by a field judgment circuit, and always produce correct field information.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A field decision circuit for deciding the fields of video signals in an interlaced scanning system, comprising:

decision means for producing field information;

first store means for receiving estimated field information from an external circuit, and for storing said estimated field information for a predetermined number of successive previous fields;

second store means for storing said field information for said predetermined number of successive previous fields; and comparison means for comparing the contents of said first store means with the contents of said second store means, said decision means changing the contents of said field information so as to coincide with said estimated field information when a comparison result obtained by said comparison means satisfies a predetermined relationship.

2. The field decision circuit according to claim 1, wherein said predetermined relationship is that the contents of said first store means disagree with the contents of said second store means for all of said predetermined number of successive previous fields.

3. The field decision circuit according to claim 1, wherein said external circuit comprises a field judgment circuit for judging whether the field of an interlaced video signal is odd or even.

* * * * *